(12) United States Patent
Monberg et al.

(10) Patent No.: US 6,550,280 B1
(45) Date of Patent: Apr. 22, 2003

(54) PROCESS OF SINTERING A HANGING SILICA TUBE SO AS TO EXHIBIT A LOW BOW

(75) Inventors: Eric M Monberg, Princeton; Frederick W. Walz, Jr., Plainfield, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/459,775

(22) Filed: Dec. 13, 1999

(51) Int. Cl.⁷ ............................................. C03B 37/012
(52) U.S. Cl. ........................ 65/395; 65/427; 264/671
(58) Field of Search .................. 65/395, 427; 264/671, 264/607

(56) References Cited

U.S. PATENT DOCUMENTS

| | | | |
|---|---|---|---|
| 4,217,027 A | 8/1980 | MacChesney et al. | 350/96.3 |
| 4,251,251 A * | 2/1981 | Blankenship | |
| 4,262,035 A | 4/1981 | Jaeger et al. | 427/39 |
| 4,775,401 A | 10/1988 | Fleming et al. | 65/3.11 |
| 4,909,816 A | 3/1990 | MacChesney et al. | 65/3.12 |
| 5,064,588 A * | 11/1991 | Misawa | 264/671 |
| 5,151,117 A * | 9/1992 | Bartholomew | 65/427 |
| 5,236,481 A * | 8/1993 | Berkey | |
| 5,240,488 A | 8/1993 | Chandross et al. | 65/3.11 |
| 5,378,345 A * | 1/1995 | Taylor | |
| 5,417,399 A * | 5/1995 | Saito | |
| 5,665,132 A * | 9/1997 | Ruppert | 65/427 |
| 5,993,985 A * | 11/1999 | Borglum | |
| 6,013,224 A * | 1/2000 | Hattori | |

FOREIGN PATENT DOCUMENTS

| | | | |
|---|---|---|---|
| JP | 5-280310 | * 10/1993 | 264/671 |

* cited by examiner

*Primary Examiner*—John Hoffmann
(74) *Attorney, Agent, or Firm*—Scott J. Rittman

(57) ABSTRACT

The invention involves fabricating a ceramic tube, e.g., a silica overcladding tube, with very little bow, e.g., about 0.3 mm per meter or less. In particular, the invention involves securing the tube by a handle that both allows the tube to hang plumb during treatment, and also is capable of deforming during such heat treatment to maintain the plumb arrangement.

13 Claims, 2 Drawing Sheets

PROCESS OF SINTERING A HANGING SILICA TUBE SO AS TO EXHIBIT A LOW BOW

BACKGROUND OF THE INVENTION

1. Field of the Invention

The invention relates to fabrication of silica optical fiber, in particular fabrication of fiber preforms by a rod-in-tube technique.

2. Discussion of the Related Art

Optical fiber is produced from a glass preform. The preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

Optical transmission fiber typically contains a high-purity silica glass core optionally doped with a refractive index-raising element such as germanium, an inner cladding of high-purity silica glass optionally doped with a refractive index-lowering element such as fluorine, and an outer cladding of undoped silica glass. In some manufacturing processes, the preforms for making such fiber are fabricated by forming an overdadding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775, 401, the disclosure of which is hereby incorporated by reference.

Forming a fiber preform using such a process therefore requires both a substrate tube and an overcladding tube. Previously, both types of tubes were formed from fused quartz or by soot methods, i.e., depositing glass on a mandrel by directing at the mandrel glass particles formed by flame hydrolysis of silicon tetrachloride. Both methods were energy intensive and costly, however, and alternatives were sought.

Because the outer cladding of a fiber is distant from transmitted light, the overcladding glass does not have to meet the optical performance specifications to which the core and the inner cladding must conform (but still must be substantially free of flaw-inducing refractory oxide particles). For this reason, efforts to both ease and speed manufacture of fiber preforms focused on methods of making overcladding tubes. One area of such efforts is the use of a sol-gel casting process.

U.S. Pat. No. 5,240,488 (the '488 patent), the disclosure of which is hereby incorporated by reference, discloses a sol-gel casting process capable of producing crack-free overcladding preform tubes of a kilogram or larger. In the process of the '488 patent, a colloidal silicon dispersion, e.g., filmed silica, is obtained. To maintain adequate stability of the dispersion and prevent agglomeration, the pH is raised to a value of about 11 to about 14 by use of a base, and the dispersion is then aged. Subsequent to aging, as discussed in Col. 15, lines 39–65 of the '488 patent, a gelling agent such as methyl formate is added to the dispersion to lower the pH. Typically, once the gelling agent is added, but before gellation occurs, the mixture is pumped into a tubular mold containing a central mandrel, and the gel is aged in the mold for 1 to 24 hours. The mandrel is removed, and the gelled body is then extracted from the mold, typically by launching the body from the mold in water to prevent breakage. The body is then dried, fired to remove volatile organic materials and water, and then sintered to form the finished overcladding tube. The core rod is then inserted into the tube, and the assembly is collapsed into a fiber preform.

There are numerous issues involved in performing, for example, the steps of drying, firing, and sintering, since the intent is to produce a tube meeting relatively stringent physical and chemical specifications. One such specification is the bow of the resultant overcladding tube. The bow is desirably as small as possible, since any bow present can potentially interfere with core rod insertion, which can ultimately affect the properties of the fiber drawn from the finished preform. Techniques for attaining overcladding tubes having very little bow are therefore desired.

SUMMARY OF THE INVENTION

The invention involves fabricating a ceramic tube, e.g., a silica overcladding tube, with very little bow, e.g., as low as 0.3 mm per meter. In particular, the invention involves securing the tube by a handle that both allows the tube to hang plumb during treatment, and also is capable of deforming during such heat treatment to maintain the plumb arrangement. In one embodiment, reflected in FIG. 1C, a handle tip 22 is inserted into the bore of the tube 10 such that holes 12, 24 in the tube and the tip are aligned, and a silica pin 30 is inserted. The tube is hung by securing the opposing end of the handle, and the tube/handle assembly is fired at a temperature suitable to remove any remaining impurities, generally by raising the assembly through the hot zone of a furnace. Once the entire tube has been fired, the furnace is generally heated to a sintering temperature, and the tube is pulled back up through the hot zone (an ascending sinter). The green silica tube tends to shrink to ¾ of its original diameter during this sinter. However, the high temperature softens the silica and thereby induces some flexibility to the tube and the handle tip. The tube thus deforms around the tip, forming a continuous interface, with the tip deforming as well. The handle tip tends to deform in the plumb arrangement, as opposed to the tube being forced to bow to remain plumb, and this deformation of the tip substantially reduces inducement of bow in the tube.

DETAILED DESCRIPTION OF THE INVENTION

The invention involves fabricating a ceramic tube, e.g., a silica overcladding tube, with very little bow, e.g., typically less than 0.3 mm per meter, optionally as low as 0.1 mm per meter. In one embodiment involving fabrication of a silica overcladding tube by a sol-gel process, such as discussed in U.S. Pat. No. 5,240,488, the process of the invention is as follows.

A sol-gel silica tube is launched and dried as discussed above. The tube is then heated, e.g., to around 900 to 1000° C., to burn out some organics as well as water (often referred to as a dehydroxylation step). Subsequent to this dehydroxylation step, the tube is in green form, i.e., the tube is not sintered to glass, but is stronger than a gel body. In this green form, the tube is capable of being machined.

Figure 1A:
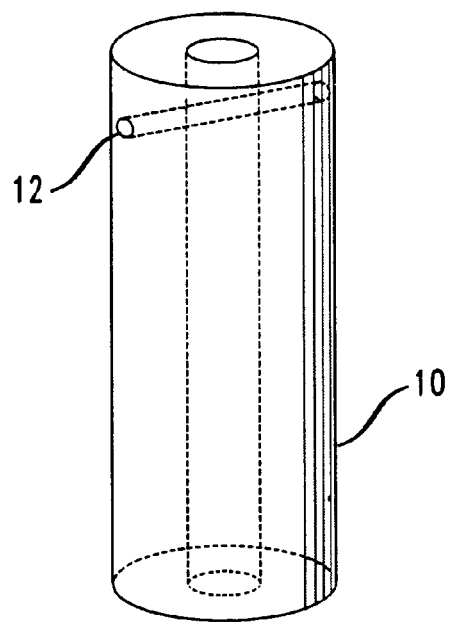
FIGS. 1A–2 illustrate the configuration of ceramic tube and handle tip useful in the invention.

As shown in FIG. 1A, a hole 12 is formed, typically by drilling, through the entire diameter of the tube 10 in a direction perpendicular to the tube axis. The hole 12 is proximate to one end of the tube, and is typically located a distance from the tube end at least equal to the tube wall thickness. The hole 12 should be through the true diameter of the tube 10. (The singular term "hole" is used, although there are essentially two holes—through opposing walls of the tube. As used herein, hole indicates either a single hole through a solid body, or aligned holes through opposing walls of a tubular body.)

Figure 1B:
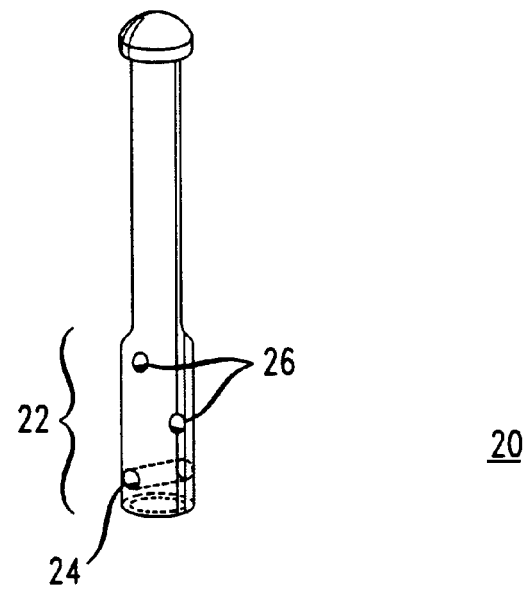

A handle 20 having a tip 22 is provided, as shown in FIG. 1B. The handle tip 22 is typically tubular, and, in this embodiment, is formed from silica. The tube wall should be of sufficient thickness to avoid excessive stretching during the subsequent processing steps, e.g., thickness ranging from 4 mm to 8 mm for 15 kg green tube bodies. The tip 22 has a hole 24 formed therein that corresponds to the hole 12 in the overcladding tube 10. The tip 22 typically contains venting holes 26, which allow undesirable gases, e.g., water vapor, to escape during sintering (see below). The outer diameter of the tip 22 is generally close to the inner diameter of the overcladding tube 10, e.g., about 1 mm less. This close fit allows for relatively precise centering of the tip 22 into the tube 10, as discussed below.

Figure 1C:
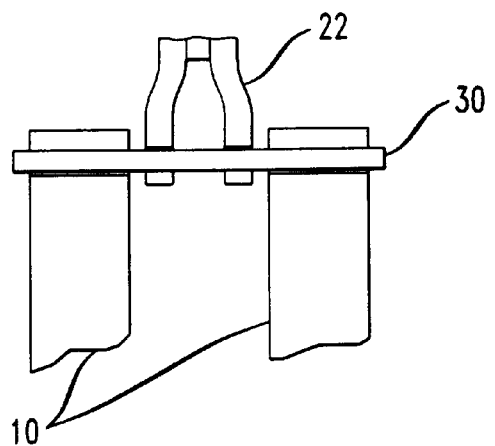

As shown in the schematic cross-section of FIG. 1C, the tip 22 is inserted into the bore of the tube 10 such that the holes 12, 24 are aligned, and a silica pin 30 is inserted. The close fit of the tip 22 outer diameter to the inner diameter of the tube 10 provides for relatively low misalignment to one side or the other, which is useful in attaining only a very small bow, as discussed below. The pin should be at least 10% longer than the outer diameter of the overcladding tube 10. Generally a pin diameter of about 6 mm is sufficient for overcladding tubes having (in green form) an outer diameter of 120 mm and a length of 1600 mm. The holes formed for the pin 30 should be just slightly larger than the pin diameter.

Figure 2:
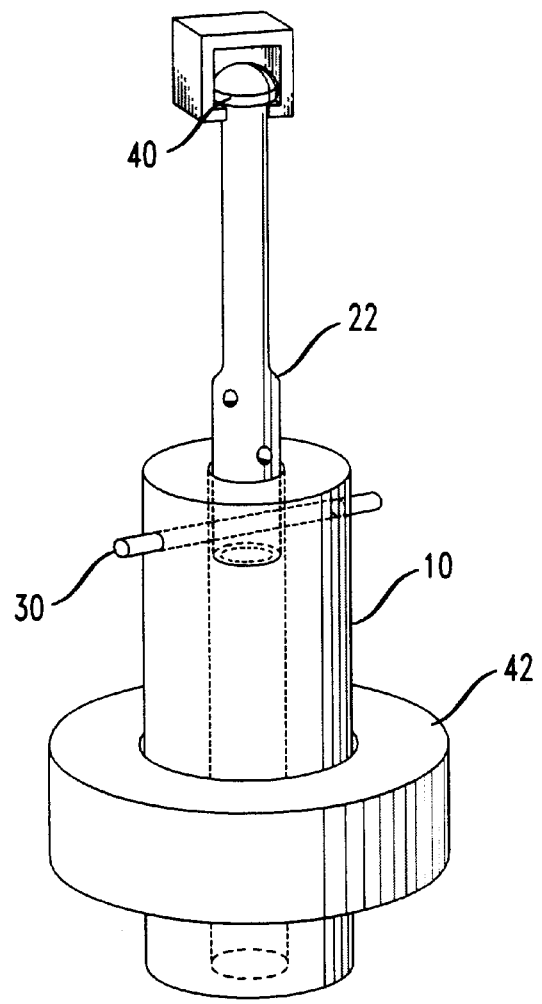

Then, as shown in FIG. 2, the tube is hung by securing the opposing end of the handle 20, which has some shape, e.g., a knob 40 or fitting suitable for a universal joint, that allows the tube 10 to hang plumb in a furnace 42. A variety of configurations are suitable for this opposing end of the handle, with the goal being freedom of the handle, and thus the tube, to hang plumb, or at least substantially plumb.

Next, the tube/handle assembly is typically fired at a temperature suitable to remove any remaining impurities, e.g., at temperature around 1000 to 1300° C. Generally this is performed by translating or traversing the assembly through the hot zone of a furnace. Vent holes provided in the handle tip, as mentioned above, are advantageous in that they allow gaseous impurities, including water, to flow out from the interior of the tube.

Once the entire tube has been fired, the furnace is generally heated to a sintering temperature, e.g., around 1500° C., and the tube is pulled back up through the hot zone (an ascending sinter). The green silica tube tends to shrink to ¾ of its original diameter during this sinter. However, the high temperature softens the silica and thereby induces some flexibility to the tube and the handle tip. Thus, at the area where the handle tip is inserted within the tube, the tube deforms around the tip, forming a continuous interface between the tip and tube, with the tip deforming as well. The joining of tip and tube occurs while the tube is hanging plumb, and the handle tip thus tends to deform to maintain this plumb position, instead of the tube itself bowing to maintain plumb. And this deformation of the tip, instead of the tube, substantially reduces inducement of bow in the tube. The dimensions of the handle tip therefore should not be so large that such deformation is inhibited. Also, assembly of the handle tip into the tube, discussed above, is advantageously performed such that the tube shrinks in an axially symmetric manner around the handle tip. This symmetrical shrinkage is also important to attaining the desired bow. (Typically, the handle is rotated during firing of the silica tube to achieve, or at least approach, thermal symmetry.)

(After the firing step, it is possible to pull the entire tube back up to its top position, heat the furnace to the sintering temperature, and then lower the tube back through, but such a descending sinter provides less desirable results, because the tip/tube interaction does not occur until the very end of the sinter.)

After sintering, a consolidated glass tube is obtained, having very little bow, e.g., as low as about 0.3 mm per meter. Advantageously, the handle is fabricated such that the tip is able to be cut from the remainder of the handle assembly, and a new tip attached. In this way, the consumable items used in the process are reduced.

By attaining a substantially straight tube according to the invention, it is possible to insert a core rod into the tube with very low incidence of marring, scratching, or other defacing, i.e., the less the bow, the less the likelihood of hitting the sides of the tube during core rod insertion. Also, a close match of the core rod outer diameter and the overcladding tube inner diameter contributes to more desirable properties of the resultant fiber. In addition, the process is relatively simple to perform, and the tip/tube assembly is physically robust, exhibiting low level of mechanical failure. Due to these characteristics, as well as the low consumables, the process is cost effective.

Once the sintered tube is formed, it is possible to form a fiber preform by placing a core rod into the tube, and collapsing the assembly. Fiber is then drawn according to conventional techniques.

The process of the invention is also contemplated for use with tubes formed with other ceramic materials and for various applications where substantially no bow is desired or required, in accordance with the guidelines presented above. In addition, other physical embodiments of the handle, handle tip, and pin are possible. Other techniques for inserting the pin and forming the hole in the tube and/or tip are also possible.

Other embodiments of the invention will be apparent to those skilled in the art from consideration of the specification and practice of the invention disclosed herein.

What is claimed is:

1. A process for fabricating an article, comprising the steps of:
   providing an unsintered ceramic tube;
   forming a hole through the entire diameter of the ceramic tube, where the hole is perpendicular to the tube axis, and where the hole is located proximate to a first end of the tube;
   inserting into the first end of the tube a tip of a handle, where the handle tip comprises a hole perpendicular to the long axis of the handle, the hole corresponding to the hole in the ceramic tube;
   providing a pin through the hole in the tube and the hole in the handle tip;
   securing the end of the handle opposite the tip, such that the tube is able to hang at least substantially plumb; and
   firing the ceramic tube while the tube is hanging at least substantially plumb.

2. The process of claim 1, wherein the ceramic tube is a silica tube.

3. The process of claim 2, wherein the silica tube was formed by a sol-gel process.

4. The process of claim 3, wherein the provided silica tube is in a green state, and wherein the steps of forming the hole in the tube, inserting the handle tip in the tube, providing the pin, and securing the handle are performed while the tube is in the green state.

5. The process of claimed 4, wherein the handle tip is tubular and is formed from silica.

6. The process of claim 5, wherein the pin is formed from silica.

7. The process of claim 3, wherein the firing step involves the steps of purifying the tube while the tube is passed downward through a furnace, and sintering the tube while the tube is passed upward through the furnace.

8. The process of claim 7, wherein the handle tip is tubular and is formed from silica.

9. The process of claim 8, wherein the bow is about 0.1 mm per meter.

10. The process of claim 2, wherein the fired tube exhibits a bow of about 0.3 mm per meter or less.

11. The process of claim 10, wherein the fired tube exhibits a bow of about 0.1 mm per meter.

12. The process of claim 1, wherein the handle tip is tubular.

13. A process for fabricating an article, comprising the steps of:
    securing an unsintered silica tube such that it is able to hang substantially plumb; and
    sintering the tube while the tube is hanging substantially plumb,
    wherein the sintered tube exhibits a bow of about 0.3 mm per meter or less.

* * * * *